April 25, 1933.   H. M. CAMERON   1,905,898
LOW TYPE EVEN BALANCE COUNTER SCALE
Filed June 11, 1929   3 Sheets-Sheet 2

INVENTOR
HUGH M. CAMERON
BY J. S. Wooster
ATTORNEY

April 25, 1933.  H. M. CAMERON  1,905,898
LOW TYPE EVEN BALANCE COUNTER SCALE
Filed June 11, 1929  3 Sheets-Sheet 3
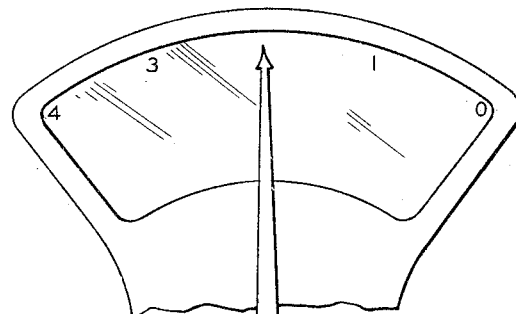
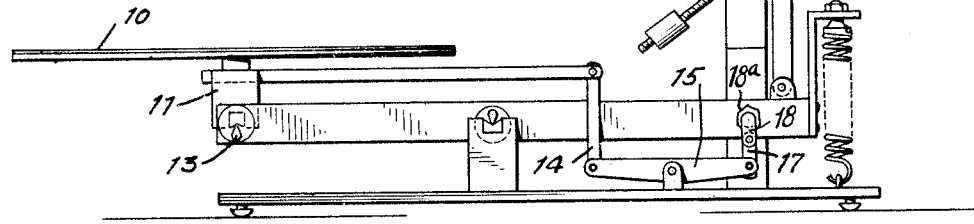
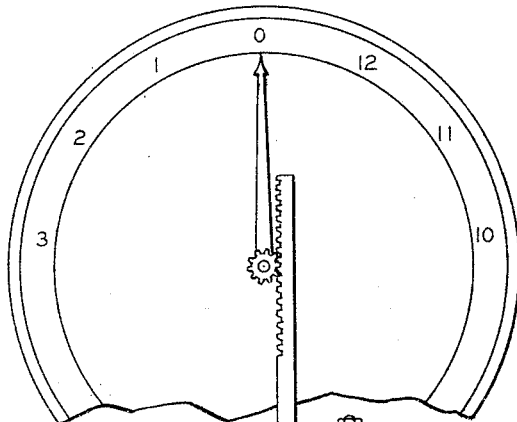
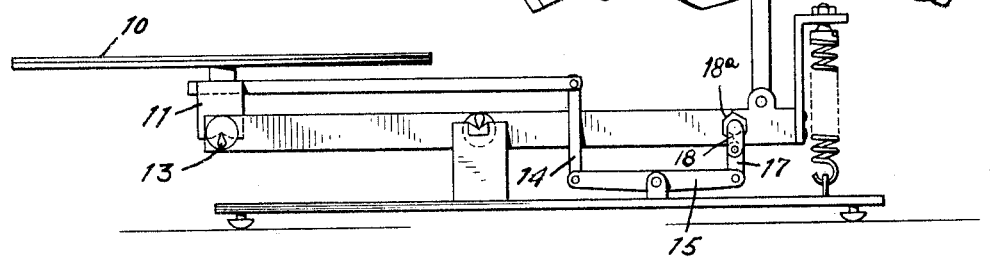
INVENTOR
HUGH M. CAMERON
BY
ATTORNEY Patented Apr. 25, 1933

1,905,898

UNITED STATES PATENT OFFICE

HUGH M. CAMERON, OF WOODHAVEN, NEW YORK, ASSIGNOR, BY MESNE ASSIGNMENTS, TO SEEDERER-KOHLBUSCH, INC., OF JERSEY CITY, NEW JERSEY, A CORPORATION OF NEW JERSEY

LOW TYPE EVEN BALANCE COUNTER SCALE

Application filed June 11, 1929. Serial No. 370,099.

This invention relates to a low type even balance counter scale and to a means for maintaining a scale platform in a horizontal position while keeping the value of a given weight constant regardless of its position on the platform.

An object of this invention is to provide a scale generally adapted for the same uses as the well known parallelogram even balance counter scale but more accurate, more easily adjustable, and having its weighing platform unusually close to the counter.

In scales of this type, the weighing platforms, platens, or scoops are pivoted on a pair of knife edges, and, consequently, means for keeping the platforms level must be provided which will not destroy the accuracy of the weight indicated if the object being weighed is not placed in the center of the platform. Heretofore this has been accomplished by the well known parallelogram method which necessitated the use of vertical rods of considerable length as well as check rods whose adjustment was exceedingly difficult. Such scales are always inaccurate to a certain extent, troublesome to adjust, and require the platforms to be a considerable distance above the level of the counter, making them awkward to use.

My invention comprises pivoting a platform at one end of the main even lever of an even balance scale, connecting the platform to one end of a normally horizontal auxiliary even lever located between the platform and the opposite end of the beam, and connecting the other end of this lever to the main lever at a point on the opposite side of the fulcrum but the same distance therefrom as the platform pivot. By this means, if a weight is placed toward the edge of the platform, it will tend to tilt the platform which will force the auxiliary even lever up or down depending upon which side of the pivot of the platform the weight is placed, thereby exerting an opposite but equal force up or down on the main lever on the opposite side of its fulcrum. My invention therefore provides a means for maintaining the platform level and compensates for any displacement of the weight from the center of the platform.

If my invention is applied to an ordinary two platform counter scale, each platform is provided with an auxiliary even lever and associated parts.

The preferred embodiment of my invention shown in the drawings is a two platform counter scale and comprises beside the platform supporting device a novel "under and over" indicating means in which the pointer is pivoted at the center of the scale and is connected by a spring, attached to a laterally extending arm on each side of it, to the means connecting each platform support to its auxiliary even lever. The pointer will then indicate on a graduated scale the amount under or over a standard weight placed on one of the platforms.

The preferred form of my invention is illustrated in the drawings in which:

Fig. 6 is a front elevation of a scale having a fan shaped dial.

Fig. 7 is a front elevation of a scale having a circular shaped dial.

Figures 3, 4:
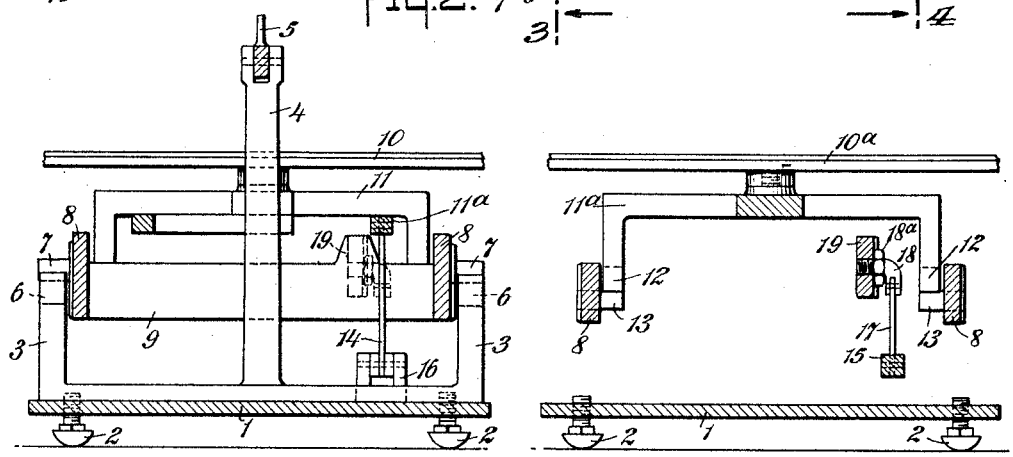
Fig. 3 is a section on the line 3—3 of Fig. 2 in the direction of the arrows, with the left hand platform in position.
Fig. 4 is a section on the line 4—4 of Fig. 2, in the direction of the arrows with the right hand platform in position.
Figure 5:
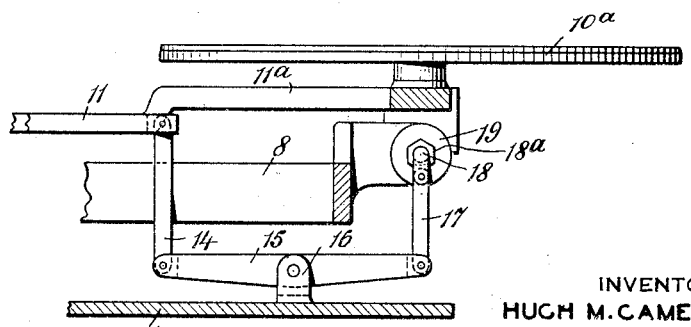
Fig. 5 is a section on the line 5—5 of Fig. 2 in the direction of the arrows with the right hand platform in position.

As shown in the drawings, the base 1, supported by leveling screws 2, has mounted thereon at the front and back but centrally with respect to its ends two main bearings supports 3, preferably made in an integral U-shaped piece with a centrally located standard 4 on which the pointer 5 is pivoted as shown in Fig. 3. Mounted in the supports 3 are main bearings 6 for knife edges 7 of the rectangular frame forming the main even lever which comprises side bars 8 and end bars 9, preferably made in a single casting.

Figure 1:
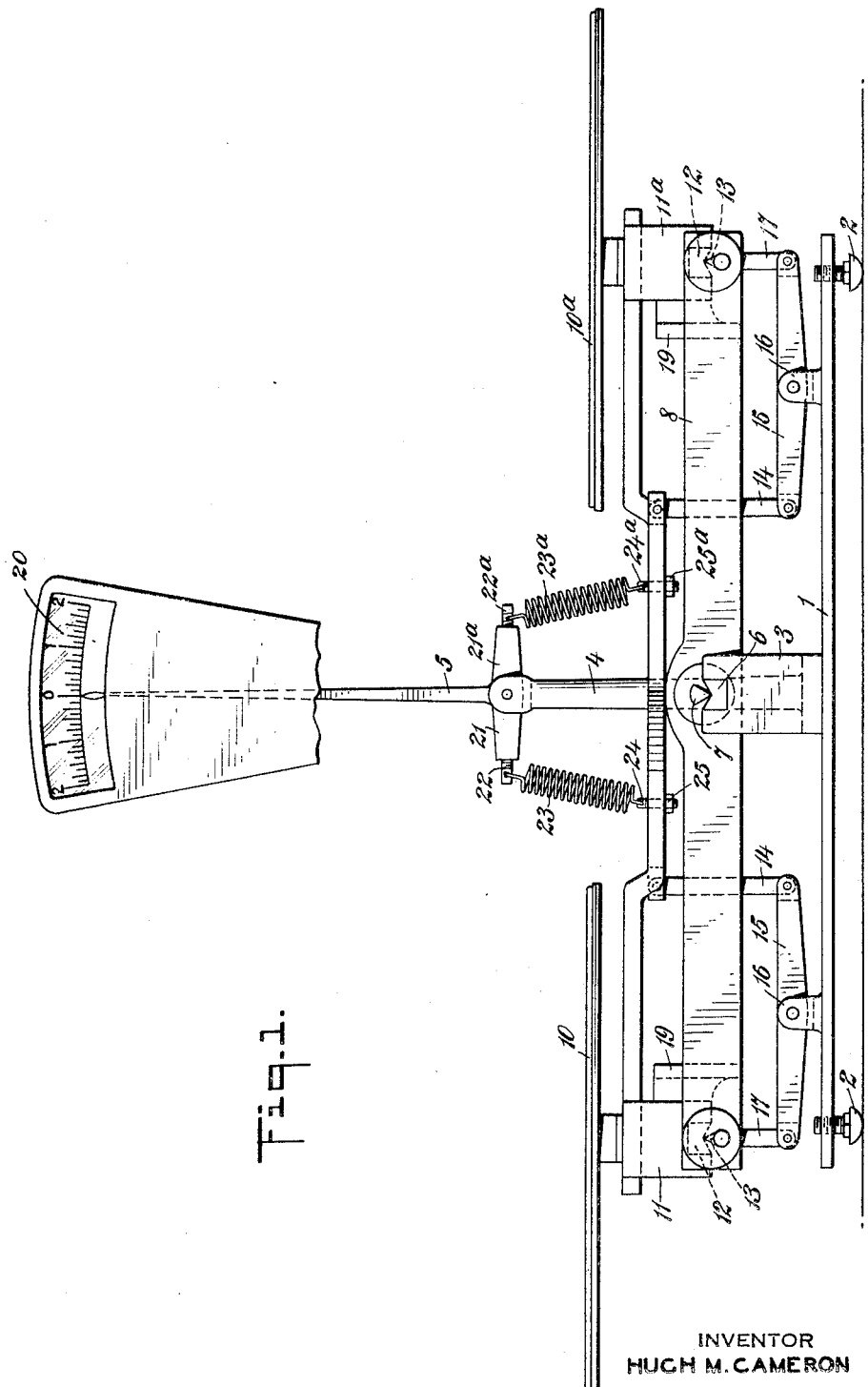
Fig. 1 is a front elevation of the scale including the "over and under" indicating device.
Figure 2:
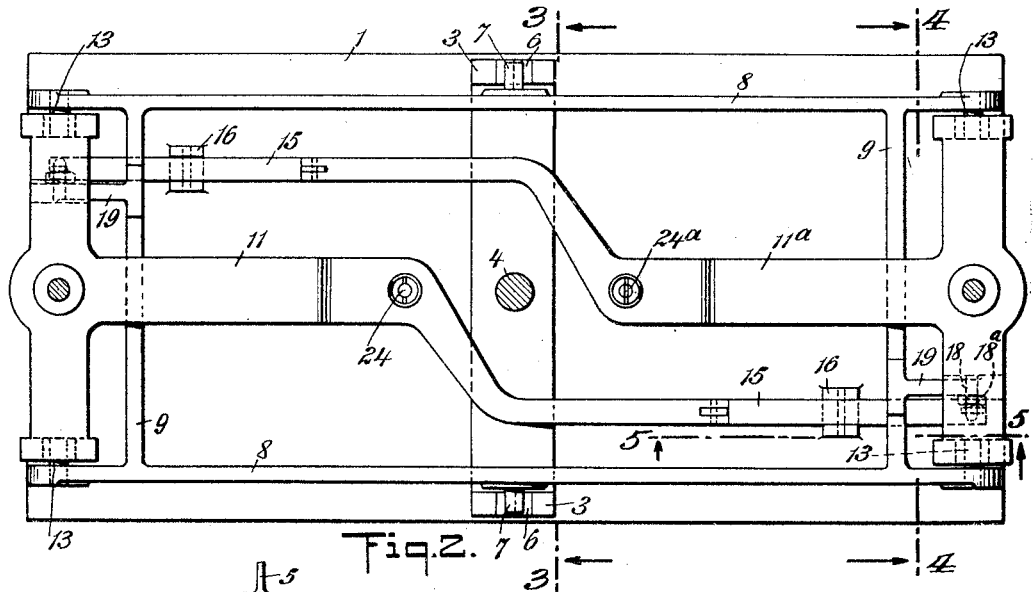
Fig. 2 is a plan view of the scale proper with the platforms removed.

Two inverted U-shaped platform supports, 11 and 11a, each having knife edge bearings 12 are pivoted at the left and right hand ends of the frame, respectively, as shown in Fig. 1, upon the knife edges 13 extending inwardly from side bars 8. Platforms 10 and 10a are mounted on supports 11 and 11a, respectively. To keep the supports 11 and 11a from tilting and to counteract variations in weight caused by placing articles and weights on the edges of the platforms 10 and 10a, each support has a horizontally extending arm whose outer end is pivotally connected to a connecting link 14 which in turn is similarly connected to one end of an auxiliary even lever 15 pivoted in the bracket 16 on base 1. A connecting link 17 is pivotally connected at one end to the other end of lever 15 and at its other end to the bent threaded stem 18 (see Fig. 4) which is adjustably mounted by means of the chuck nut 18a in the arm 19 made integral with end bars 9 of the frame. By turning the stem 18, the distance at which force is applied to the main even lever from the knife edges 7 thereof can be varied to compensate for any wear on the parts.

In the operation of the scale, if the weights or articles to be weighed should be placed exactly in the center of the platforms, the members 11 and 11a would have no tendency to tilt in either direction and therefore the levers 15 would not come into play. Ordinarily a weight is never placed in the exact center of the platform so that the levers 15 are always in use. Suppose, for example, a one-pound weight is put on the left hand edge of the platform 10 (Fig. 1), the weight obviously would counter-balance more than a one-pound weight placed in the center of the other platform if no compensating means were present, as it is further from the pivot of the main lever of the scale. The weight however will tend to make platform 10 tilt to the left, consequently tending to raise the right hand end of support 11 which tends to raise the left hand end of auxiliary lever 15, lower the right hand end of this lever and thereby exert a downward force on the right hand end of the main lever. This downward force on the right hand end of the main lever will be exactly equal to the excess value of the one-pound weight exerted on the pivot of platform 10 because the platform 10 and the horizontal extension of support 11 function in this case as a single first class lever and the sum of the forces acting on a first class lever are always equal to the force exerted on its pivot in the opposite direction. From this it follows that, as a one-pound force is exerted on the left hand edge of platform 10, the connecting link 14 must be exerting a force on the support 11 equal to the force on the platform pivot minus one pound. Moreover, as the lever 15 is even the same force is being exerted by connecting link 17 on the right hand end of the main lever and therefore that lever has a downward force exerted on its right hand end exactly equal to the force exerted on its left hand end in excess of one pound. It will thus be seen that any weight placed on platform 10 to the left of its pivot will have exactly the same value as the same weight would have in the center of the platform.

If the one-pound weight is placed on the right hand edge of platform 10 it will of course tend to lower the end of support 11 and exert an upward force on the right hand end of the beam of the scale. This upward force on the beam will be exactly equal to the loss in value of the one-pound weight exerted on the pivot of platform 10 because the platform 10 and horizontal extension of support 11 function now as a second class lever and the sum of the forces at the pivot and the end of the lever are always equal but opposite to the force exerted intermediately. From this it follows that, as the intermediate force is the one-pound weight on the platform 10, the connecting link must be exerting a force equal to one pound minus the force on the platform pivot. This force is transmitted to the right hand end of the main lever of the scale without change through even lever 15 so that this end of the main lever receives a force upwardly which added to the force downwardly on the pivot of platform 10 is exactly equal to one pound if the one-pound weight is put in any position on the platform 10 on the right hand side of its pivot.

From the above it will be seen that my method of maintaining the platforms level and the value of a unit of weight constant is mathematically exact.

In the preferred form of my scale as shown in Fig. 1 the pointer 5 is pivotally mounted in the standard 4 and is adapted to swing over the graduated scale 20 to accurately indicate variations in weight a small amount over or under a predetermined value, two ounces in the present case. The pointer 5 has laterally extending arms 21 and 21a carrying threaded stems 22 and 22a to which the springs 23 and 23a, respectively, are attached at one end, the other ends of these springs being attached to the threaded stems 24 and 24a carried by supports 11 and 11a. Lock nuts 25 and 25a are provided on the stems 24 and 24a to hold them in position after they are adjusted. It will be understood that the tension of springs 23 and 23a may be equalized by adjusting the various threaded stems.

As the threaded stems 24 and 24a move substantially perpendicularly when the platforms 10 and 10a move up or down and the stems 22 and 22a must move in an arc of small radius the distance between the stems 24, 24a, and 22, 22a is shortest when the pointer is at O as shown in Fig. 1. As soon as either platform goes down both springs are lengthened and resist the motion of the platforms bringing them to an equilibrium if the weights in the respective balances are nearly equal. It will be appreciated that threaded stems 24 and 24a must be laterally displaced toward their respective ends of the scale with respect to perpendiculars dropped from the ends of stems 22 and 22a, respectively, to obtain this lengthening of the springs. In other words, threaded stems 24 and 24a must be further apart than threaded stems 22 and 22a.

If desired, my method of maintaining scale platforms in a horizontal position can be applied to the type of scale having a single platform on an even lever the other end of which operates either a circular or fan shaped dial against the action of a spring as shown in Figs. 6 and 7. In such a modification platform 10a, supports 11a, and their associated lever system would be removed and the right hand end of the main lever would be connected to the mechanism for actuating the dial pointer. My system of levers is readily adapted to this type of scale because, as shown in the embodiment of the invention in the drawings, the lever system for the platform support 11 and the lever system for platform support 11a are entirely independent of each other.

Although I have shown the preferred embodiment of my invention with the auxiliary even levers mounted on the base of the scale, it is obvious that these levers may be suspended above the main lever or arranged in other ways which would come within the scope of my invention and I do not wish my invention to be limited except by the terms of the claims.

The invention claimed is:

1. In an even balance counter scale, a pivoted main lever, a platform support pivoted thereon and transversely thereto, a platform mounted on said support, an auxiliary even lever pivoted intermediate the platform support and the opposite end of the main lever, the axis of the pivot of the auxiliary lever being parallel to and fixed with relation to the axis of the pivot of the main lever, rigid means pivotally connected to the platform support and to the adjacent end of the auxiliary lever to prevent approach or separation thereof and rigid means pivotally connected to the other end of the auxiliary lever and to the main lever to prevent approach or separation thereof, said last means being connected to the main lever at a point on the main lever on the opposite side of the pivot of the main lever from the platform support but at the same distance as said platform support from the pivot of the main lever.

2. In an even balance counter scale, a pivoted main lever, a platform support pivoted on said main lever at one side of the pivot of the main lever, said support having a horizontal arm extening towards the end of the main lever on the opposite side of the pivot of the main lever, a platform mounted on said support, a pivoted auxiliary even lever laterally positioned with respect to the platform support and having one end adjacent thereto and substantially in vertical alignment with the free end of said arm and having its other end substantially in vertical alignment with a point on said main lever on the opposite side of the pivot of said main lever from said platform support but in a vertical plane at the same distance from the pivot of said main lever as the vertical plane through the pivot of the platform support, the axes of the pivots of the main lever, auxiliary lever and platform support being parallel and horizontal, and the pivot of the auxiliary lever being fixed with respect to the pivot of the main lever, rigid means for connecting said arm and said auxiliary lever pivotally secured to the end of the arm and to the adjacent end of the auxiliary lever to prevent approach or separation thereof, and rigid means for connected said main lever and said auxiliary lever pivotally secured to the other end of the auxiliary lever and to the point on the main lever in vertical alignment therewith to prevent approach or separation thereof.

3. An even balance scale comprising a pivoted main lever, a platform support pivoted on said main lever adjacent one end thereof, a platform on said support, an auxiliary even lever pivotally mounted on the base of the scale between said platform support and the opposite end of said main lever, means pivotally connecting said platform support to the adjacent end of said auxiliary lever, a member pivoted to the other end of said auxiliary lever, and adjustable means connecting said member to said main lever adjacent the end opposite the platform support to vary the distance between the pivot of the main lever and the point at which said member is connected to said main lever.

4. An even balance scale comprising a pivoted main lever, a pair of platform supports pivoted thereon, one at each end of said main lever, each support having a horizontal arm extending toward the opposite end of the main lever, platforms mounted on said supports, a pair of auxiliary even levers pivotally mounted on the base of the scale each having one end adjacent the end of the arm of one platform support and the other end adjacent the opposite end of the main lever, the axes of the pivots of the platform supports, main lever, and auxiliary levers being parallel, means pivotally connecting the end of the arm of each platform support to the adjacent end of the adjacent auxiliary lever, a member pivoted to the other end of each auxiliary lever, and adjustable means connecting each member to the adjacent end of the main lever to vary the distance at which force is applied to the main lever from the pivot thereof.

5. An even balance scale comprising a pivoted main lever, a pair of platform supports pivoted thereon, one at each end of said main lever, each support having a horizontal arm extending toward the opposite end of the main lever, platforms mounted on said supports, a pair of auxiliary even levers pivotally mounted on the base of the scale each having one end adjacent the end of the arm of one platform support and the other end adjacent the opposite end of the main lever, the axes of the pivots of the platform supports, main lever, and auxiliary levers being parallel, means pivotally connecting the end of the arm of each platform support to the adjacent end of the adjacent auxiliary lever, adjustable stems pivoted to the ends of the main lever, and links pivotally connecting the other ends of said auxiliary levers to said stems, each of said stems being bent and having the axes of their pivots parallel to the axis of the pivot of the main lever whereby the distance between the pivot of the main lever and the points at which said links are connected to said stems may be varied by turning said stems.

6. An even balance scale comprising a pivoted main lever, a pair of platform supports pivoted thereon, one at each end of said main lever, each support having a horizontal arm extending toward the opposite end of the main lever, platforms mounted on said supports, a pair of auxiliary even levers pivotally mounted on the base of the scale each having one end adjacent the end of the arm of one platform support and the other end adjacent the opposite end of the main lever, the axes of the pivots of the platform supports, main lever and auxiliary levers being parallel, means pivotally connecting the end of the arm of each platform support to the adjacent end of the adjacent auxiliary lever, means pivotally connecting the other end of each auxiliary lever to the adjacent end of the main lever, a pointer pivoted above the level of the main lever and adapted to swing over a graduated scale, and springs attached to said pointer on opposite sides of its pivot and to said platform supports on each side of said pointer between the outer ends of said supports and points perpendicularly below the points at which said springs are attached to the pointer when the scale is evenly balanced.

Signed at New York, in the county of New York and State of New York, this 10th day of June, A. D. 1929.

HUGH M. CAMERON.